US010696276B2

(12) United States Patent
Kiester et al.

(10) Patent No.: US 10,696,276 B2
(45) Date of Patent: Jun. 30, 2020

(54) WIPER BLADE LIFT SYSTEM

(71) Applicant: GM Global Technology Operations LLC, Detroit, MI (US)

(72) Inventors: Timothy A. Kiester, Orion, MI (US); Kenton L. West, Orion, MI (US); Robert J. Schlenke, Fenton, MI (US); Jason H. Ross, Oxford, MI (US)

(73) Assignee: GM GLOBAL TECHNOLOGY OPERATIONS LLC, Detoit, MI (US)

( * ) Notice: Subject to any disclaimer, the term of this patent is extended or adjusted under 35 U.S.C. 154(b) by 64 days.

(21) Appl. No.: 16/018,135

(22) Filed: Jun. 26, 2018

(65) Prior Publication Data
US 2019/0389432 A1  Dec. 26, 2019

(51) Int. Cl.
*B60S 1/34* (2006.01)
*B60S 1/18* (2006.01)
*B60S 1/04* (2006.01)

(52) U.S. Cl.
CPC ............ *B60S 1/3422* (2013.01); *B60S 1/0455* (2013.01); *B60S 1/18* (2013.01); *B60S 1/3413* (2013.01)

(58) Field of Classification Search
CPC ........ B60S 1/0455; B60S 1/18; B60S 1/3413; B60S 1/3422
USPC ....... 15/250.16, 250.317, 250.19; 296/96.15, 296/96.17
See application file for complete search history.

(56) References Cited

U.S. PATENT DOCUMENTS

| | | | | |
|---|---|---|---|---|
| 2,717,408 | A * | 9/1955 | Le Page | B60S 1/14 15/250.19 |
| 3,604,048 | A * | 9/1971 | Mainka | B60S 1/3411 15/250.19 |
| 4,866,811 | A * | 9/1989 | Kuhbauch | B60S 1/0402 15/250.19 |
| 6,453,504 | B1 * | 9/2002 | Burkard | B60R 1/0602 15/250.003 |
| 7,891,042 | B2 * | 2/2011 | Renke | B60S 1/0477 15/250.001 |

(Continued)

FOREIGN PATENT DOCUMENTS

| FR | 1558826 | * | 1/1969 |
|---|---|---|---|
| JP | 06-92203 | * | 4/1994 |

OTHER PUBLICATIONS

Machine language translation of description portion of French publication 1558826, published Jan. 1969 (Year: 1969).*

(Continued)

*Primary Examiner* — Gary K. Graham

(57) ABSTRACT

A wiper system for clearing an outer surface of a window is disclosed and includes an arm, a frame, a blade, and an actuator operatively connected to the arm. The arm includes a parked position and defines a proximate end portion and a distal end portion. The arm is pivotable about the proximate end portion of the arm out of the parked position. The frame is pivotally connected to the distal end portion of the arm. The frame defines a lengthwise distance. The blade extends along at least a lengthwise portion of the frame. The blade defines an edge that is configured to contact the outer surface of the window when the arm is in the parked position. The actuator is configured to exert a force against the arm that is sufficient to urge the arm out of the parked position and away from the outer surface of the window.

8 Claims, 5 Drawing Sheets

(56) References Cited

U.S. PATENT DOCUMENTS

2013/0042426 A1* 2/2013 Webb .................... B60S 1/0455
15/250.17

OTHER PUBLICATIONS

Machine language translation of description portion of Japanese publication 06-092203, published Apr. 1994 (Year: 1994).*

* cited by examiner

WIPER BLADE LIFT SYSTEM

INTRODUCTION

The present disclosure relates to wipers for a vehicle, and more particularly to a system that lifts wiper blades away from an outer surface of a window.

Windshield wipers are used to clear rain, snow, ice, and other debris from a vehicle's windshield. A windshield wiper typically includes a rigid arm, a frame, and a blade. The arm defines opposing ends, where one end of the arm is connected to a wiper motor by a linkage, and the other end of the arm is pivotably connected to the frame. The blade is secured along a length of the frame. The blade is usually constructed of a flexible elastomeric material such as, for example, rubber. The blade defines an edge surface that usually rests against the windshield. The frame may be hinged or curved to allow for the blade to conform to the contour of the windshield.

Sometimes the blade may freeze to the windshield in colder climates. As a result, the entire wiper sticks to the windshield and creates an obstruction as an individual scrapes ice or snow from the windshield. As a result, the individual pries or rips the frozen blade from the windshield. However, since blade may be constructed of an elastomer, the blade may tear or rip while being prying from the windshield. Some individuals may fold the wipers back so that they extend in the air and away from the windshield to prevent the rubber blade from sticking to the windshield in colder climates. However, an individual may need to lean against an exterior surface of the vehicle when folding the wiper away from the windshield. As the individual leans against the vehicle's exterior surface, his or her clothing may contact dirt, moisture, and other contaminants.

Thus, while current windshield wipers achieve their intended purpose, there is a need for a new and improved system and method for preventing wiper blades from freezing to the windshield in colder climates.

SUMMARY

According to several aspects, a wiper system for clearing an outer surface of a window is disclosed and includes an arm, a frame, a blade, and an actuator operatively connected to the arm. The arm includes a parked position and defines a proximate end portion and a distal end portion. The arm is pivotable about the proximate end portion of the arm out of the parked position. The frame is pivotally connected to the distal end portion of the arm. The frame defines a lengthwise distance. The blade extends along at least a lengthwise portion of the frame. The blade defines an edge that is configured to contact the outer surface of the window when the arm is in the parked position. The actuator is configured to exert a force against the arm that is sufficient to urge the arm out of the parked position and away from the outer surface of the window to lift the blade from the outer surface of the window.

In an additional aspect of the present disclosure, the system further comprises a bracket that operatively connects the actuator to the arm.

In still another aspect of the present disclosure, the arm includes a body that defines a lower surface.

In another aspect of the present disclosure, the bracket is shaped to support the lower surface of the arm.

In yet aspect of the present disclosure, a body of the arm defines an aperture, and the bracket is shaped to be received by the aperture.

In still another aspect of the present disclosure, the system includes a support bracket. The actuator is supported in place by the support bracket.

In yet another aspect of the present disclosure, the actuator is a solenoid.

In another aspect of the disclosure, the system includes a linkage that connects the proximate end portion of the arm to a rotational shaft.

In still another aspect of the present disclosure, the arm oscillates about the rotational shaft during operation of the wiper system.

In yet another aspect of the present disclosure, the window is one of a windshield of a vehicle, a back glass of the vehicle, or is part of a headlight of the vehicle.

In another aspect of the present disclosure, a motor operatively connected to the arm by a plurality of linkages.

In still another aspect of the present disclosure, a tensioning spring operatively coupled to the arm.

In still another aspect of the present disclosure, a system for a vehicle is provided and includes a window defining an outer surface and a wiper system including at least one wiper and a rotating shaft. The wiper oscillates about the rotational shaft to clear the outer surface of the window. The wiper includes an arm, a frame, a blade, and an actuator operatively connected to the arm. The arm includes a parked position and defines a proximate end portion and a distal end portion. The arm is pivotable about the proximate end portion of the arm out of the parked position. The frame is pivotally connected to the distal end portion of the arm. The frame defines a lengthwise distance. The blade extends along at least a lengthwise portion of the frame. The blade defines an edge that is configured to contact the outer surface of the window when the arm is in the parked position. The actuator is configured to exert a force against the arm that is sufficient to urge the arm out of the parked position and away from the outer surface of the window to lift the blade from the outer surface of the window.

In yet another aspect of the disclosure, a system for a vehicle is disclosed and includes a windshield defining an outer surface and a wiper system including a pair of wipers that are both oscillated about respective rotational shafts to clear the outer surface of the windshield. Each wiper of the pair of wipers include an arm, a frame, a blade, and an actuator operatively connected to the arm. The arm includes a parked position and defines a proximate end portion and a distal end portion. The arm is pivotable about the proximate end portion of the arm out of the parked position. The frame is pivotally connected to the distal end portion of the arm. The frame defines a lengthwise distance. The blade extends along at least a lengthwise portion of the frame. The blade defines an edge that is configured to contact the outer surface of the window when the arm is in the parked position. The actuator is configured to exert a force against the arm that is sufficient to urge the arm out of the parked position and away from the outer surface of the window to lift the blade from the outer surface of the window.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
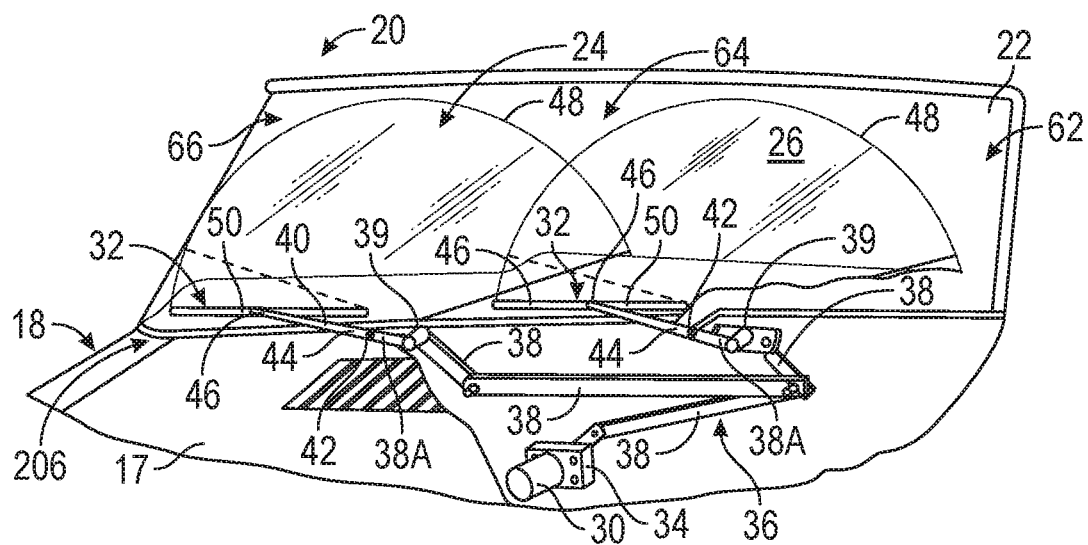
FIG. 1 is a fragmentary perspective view of a front portion of an exemplary vehicle showing a wiper system according to an exemplary embodiment.

Referring to FIG. 1, a front portion 18 including a hood 17 of a vehicle 20 having a front windshield 22 is shown. The vehicle 20 includes a wiper system 24 configured to clear debris and precipitation such as rain, snow, or ice from an outer surface 26 of the front windshield 22. The wiper system 24 includes a wiper motor 30 and a pair of wipers 32. A gear assembly 34 is used to operatively connect the motor 30 to a linkage assembly 36. The linkage assembly 36 includes a plurality of linkages 38 connecting the motor 30 to the to the wipers 32. The wipers 32 each include an arm 40, a frame 52, and a blade 54 (the blade is visible in FIG. 2). The arms 40 each define a proximate end portion 44 and a distal end portion 46. A pivot shaft 42 is provided to connect to the proximate end portion 44 of each arm 40 to a corresponding connecting linkage 38A. The connecting linkages 38A both rotate about a rotational shaft 39.

The wipers 32 are oscillated about their respective rotational shafts 39 to clear the outer surface 26 of the windshield 22. Specifically, as seen in FIG. 1 the wipers 32 move in arcuate paths 48 across respective sweep regions of the windshield 22 as the arms 40 swing back and forth about their respective rotational shafts 39. The arms 40 are driven back and forth about the rotational shafts 39 by the motor 30. In the exemplary embodiment as shown, the wiper system 24 includes a single motor 30. However, it is to be appreciated that in an alternative embodiment independent synchronized motors may also be used to drive each arm 40.

Although FIG. 1 illustrates the wiper system 24 clearing the front windshield 22, it is to be appreciated that the wiper system 24 is not limited to clearing a vehicle windshield. Instead, the disclosed wiper system 24 may be used to clear the surface of any window. For example, the wipers 32 may be used to clear the outer surface of the back glass or window of a vehicle. In another example, the wipers 32 may be used to clear an outer surface of a headlight of a vehicle. Furthermore, although FIG. 1 illustrates two wipers 32, in another embodiment the wiper system 24 may include a single wiper 32. Moreover, in another embodiment the wiper system 24 may include more than two wipers 32.

In the example as shown, the wiper system 24 is operated as a single motor tandem scheme with one of the wipers 32 on a driver's side 62 of the vehicle 20 and the other wiper 32 located in a position slightly offset from a middle portion 64 of the front windshield 22. Although a tandem scheme is shown, it is to be appreciated that the wiper system 24 may employ a variety of wiper system schemes. For example, in another embodiment the wiper system 24 may employ an opposed wiper scheme. An opposed wiper scheme includes one of the wipers 32 positioned on the driver's side 62 of the vehicle 20 and the remaining wiper 32 is positioned on a passenger's side 66 of the vehicle 20, where both the wipers 32 pivot towards the middle portion 64 of the windshield 22. The wipers 32 are flexed against the outer surface 26 of the windshield 22 to distribute pressure evenly along a length L of each blade 54 (the length L of the blade 54 is labeled in FIG. 2).

Figure 2:
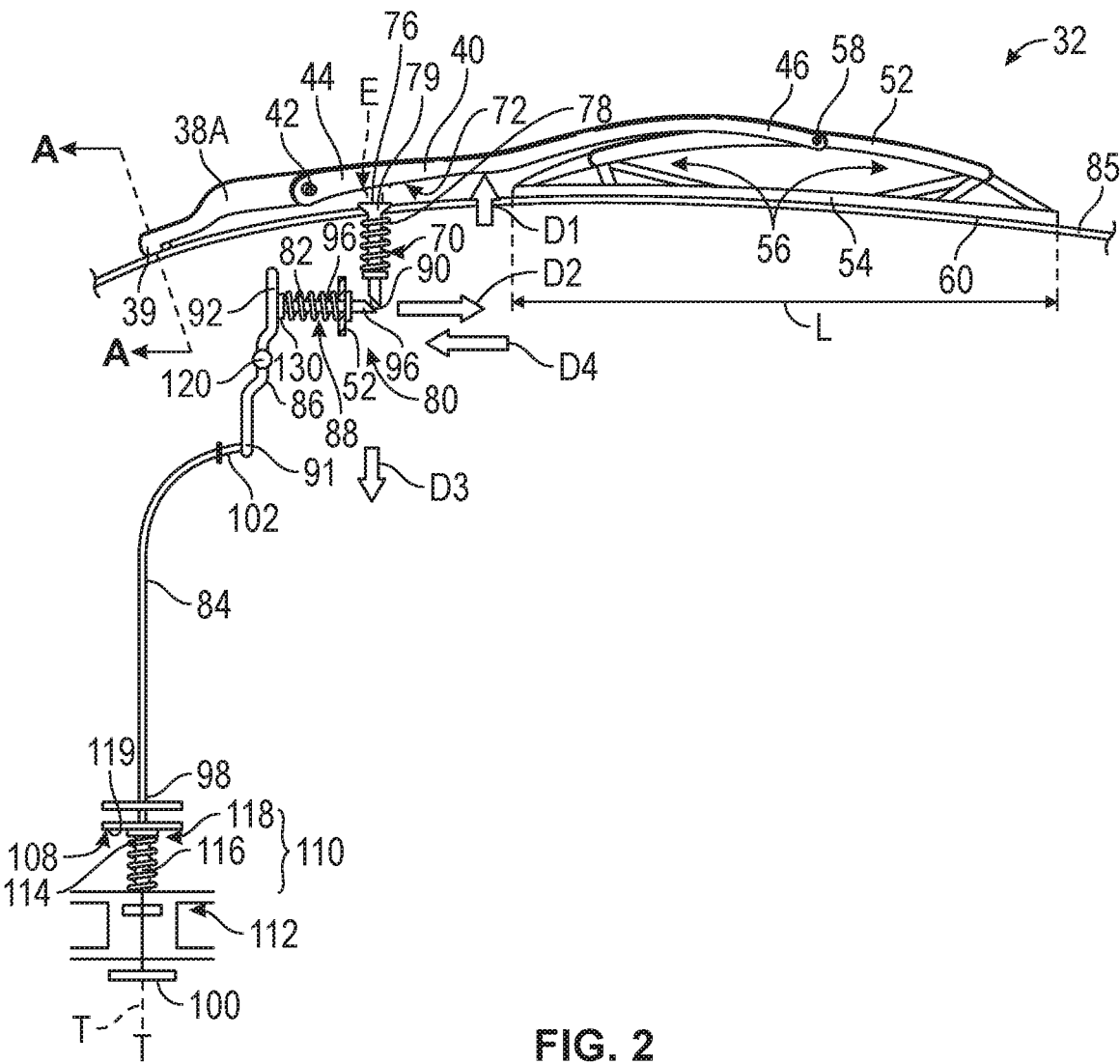
FIG. 2 is a top view of one of the wipers shown in FIG. 1 abutting against an outer surface of a windshield and a system for lifting the blade away from the windshield according to an exemplary embodiment.

Turning now to FIG. 2, a top view of one of the wipers 32 is shown. FIG. 2 also illustrates the proximate end portion 44 of the arm 40 pivotably connected to the linkage 38A at the pivot shaft 42. Referring to both FIGS. 1 and 2, the wiper 32 includes the arm 40, the frame 52, and the blade 54. The proximate end portion 44 of the arm 40 is pivotably connected to the pivot shaft 42, and the distal end portion 46 is the arm 40 is rotatably connected to the frame 50 by a pin 58. The linkage shaft 38A oscillates about the rotational shaft 39 about an axis of rotation A-A. That is, the linkage 38A oscillates back and forth about the axis of rotation A-A in the arcuate path 48 across the windshield 22 seen in FIG. 1.

In the embodiment as shown in FIGS. 1 and 2 the arms 40 are in a parked position. When in the parked position, the blade 54 contacts the outer surface 26 of the windshield 22 and arm 40 is not operating. In other words, when the arm 40 is not being driven back and forth by the motor 30 to move in arcuate paths 48 across respective sweep regions of the windshield 22, then the arm 40 is in parked position. When commencing operation of the wiper assembly 24, both the arms 40 may be rotated about the axis of rotation A-A and out of the parked position.

The frame 52 is pivotally connected to the distal end portion 46 of the arm 40 by the pin 58. In the embodiment as shown in FIG. 2, the frame 52 includes a plurality of claws 56 for holding the blade 54. The claws 56 are used to distribute pressure evenly along the blade 54. Although a plurality of claws 56 are shown, it is to be appreciated that the embodiment shown in FIG. 2 is merely exemplary in nature. The frame 52 may include a variety of other configurations for securing and evenly distributing pressure along the length L of the blade 54. For example, in another embodiment the frame 52 may include a beam design for securing and distributing pressure along the length L of the blade 54.

The blade 54 extends along and contacts a portion of the outer surface 26 of the windshield 22. Specifically, the blade 54 defines an edge 60, where the edge 60 of the blade 54 is configured to contact the outer surface 26 of the windshield 22 when the arm 40 is in the parked position. The edge 60 of the blade 54 moves along and is configured to maintain substantially continuous contact with the outer surface 26 of the windshield 22 as the arm 40 oscillates back and forth about the axis of rotation A-A. The edge 60 of the blade 54 may be used to wipe debris and precipitation off the outer surface 26 of the windshield 22.

A lift element 70 is positioned to face a portion 72 of the arm 40. The lift element 70 includes a retracted position and an extended position. In the embodiment as shown in FIGS.

2 and 3, the lift element 70 is in the retracted position, and a phantom line E is drawn to show a portion of the lift element 70 in the extended position. When in the retracted position, the lift element 70 is positioned further away from the arm 40 when compared to the extended position E. When the lift element 70 is actuated into the extended position E, the lift element is moved in a direction D1 towards the arm 40. In the embodiment as shown in FIGS. 2 and 3, the lift element 70 defines a surface 76.

Figure 3:
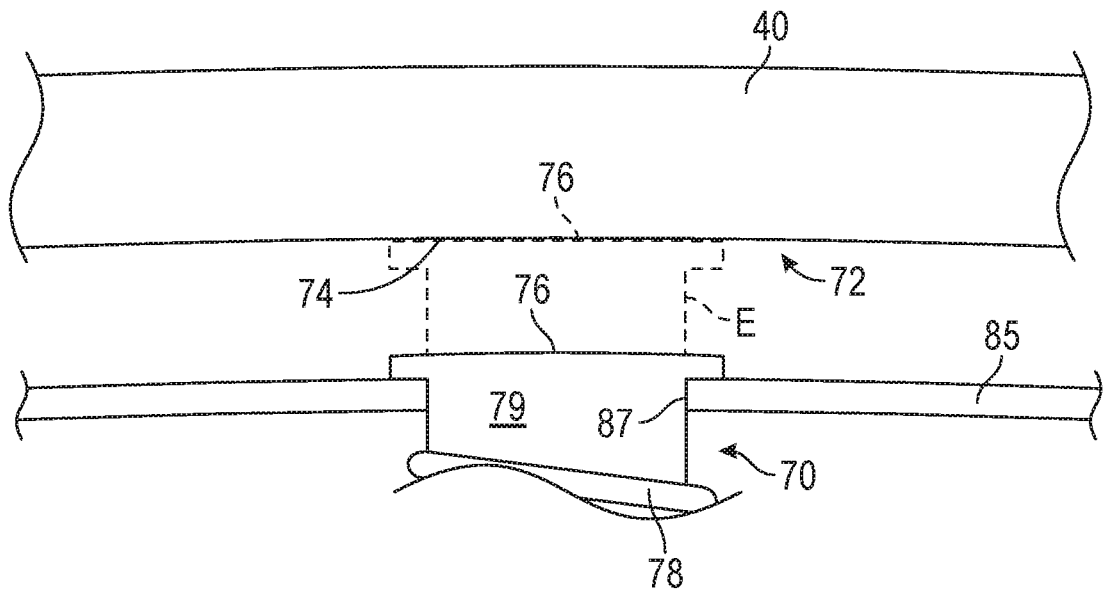
FIG. 3 is an enlarged view of a lift element shown in FIG. 2.

As seen in FIG. 3, the surface 76 of the lift element 70 is shaped to abut against a surface 74 of the arm 40. When the lift element 70 is actuated into the extended position, the arm 40 is urged away from the outer surface 26 of the windshield 22. That is, when the lift element 70 is actuated into the extended position E, the lift element 70 abuts against and exerts a force against the arm 40, where the force exerted upon the arm 40 is sufficient to lift the arm 40 away from the windshield 22. Moving the arm 40 away from the windshield 22 also causes the edge 60 of the blade 54 to also lift off the outer surface 26 of the windshield 22. As explained below, a driver or other occupant of the vehicle 20 may actuate a lever 100 to lift the blade 54 away from the outer surface 26 of the windshield 22. The lever 100 is operatively connected to the lift element 70 by an actuation system 80.

Although the disclosure describes the lift element 70 directly abutting against the arm 40, it is to be appreciated that the lift element 70 may not directly contact the arm 40 when in the extended position. In other words, a second lift element (not shown in the figures) may be included, where the lift element 70 lifts the may contact and cause the second lift element to move towards and lift the arm 40.

It is to be appreciated that in some colder climates the blade 54 of the wipers 32 may freeze to the windshield and create an obstruction as an individual scrapes ice or snow from the windshield 22. The current solution followed by some individuals is to fold the wipers back so that the wipers extend in the air and away from the windshield to prevent the blade from sticking to the windshield. In contrast, the lift element 70 shown in FIGS. 2 and 3 is used to lift the blade 54 away from the outer surface 26 of the windshield 22. In one embodiment, the lift element 70 lifts the blade 54 of the wiper 32 at a distance that is sufficient to completely lift the edge 60 of the blade 54 off the outer surface 26 of the windshield 22. It should also be appreciated that the distance is sufficient to accommodate the curvature of the blade 54. The curvature of the blade 54 may also be referred to as the crown. In other words, the distance between the edge 60 of the blade 54 and the outer surface 26 of the windshield 22 when the blade 54 if lifted is sufficient so that the blade 54 does not contact the windshield 22. It should be appreciated that the blade 54 in shown in FIG. 2 is drawn without a substantial crown.

The actuation system 80 is in operative communication with the lift element 70. The actuation system 80 deploys the lift element 70 from the retracted position and into the extended position E (seen in FIG. 3) to exert the force against the arm 40. The force is of sufficient magnitude to urge the arm 40 out of the parked position. As explained in greater detail below, the actuation system 80 exerts a force against the lift element 70, which urges the lift element 70 in the direction D1 and towards the arm 40. In the embodiment as shown in FIG. 2, the actuation system 80 exerts the force in a direction D2 that is substantially perpendicular with the first direction D1. However, it is to be appreciated that the actuation system 80 shown in FIG. 2 is merely exemplary in nature and that the force exerted by the actuation system 80 may be oriented in other directions as well.

Referring to FIGS. 2 and 3, in the embodiment as shown, a biasing member 78 that is a coil spring is provided. The coil spring defines an opening (not visible in the figures), where the body 79 of the lift element 70 is shaped to be received by the opening defined by the coil spring. FIGS. 2 and 3 also illustrate a portion of sheet metal 85. The sheet metal 85 defines an aperture or opening 87. The opening 87 defined by the sheet metal 85 is shaped to receive the body 79 of the lift element 70.

Figure 4:
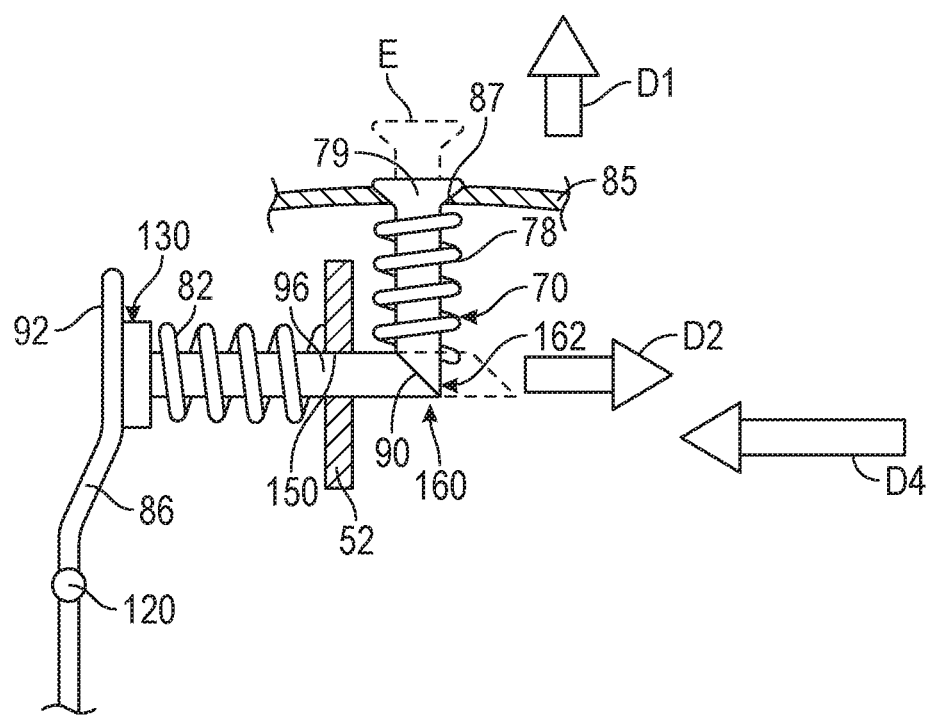
FIG. 4 is an enlarged view of the lift element and a portion of an actuator element shown in FIG. 2.

Referring to FIGS. 2 and 4, the actuation system 80 includes a cable 84, a pivot arm 86, and a spring-loaded stopper 88. The spring-loaded stopper 88 is spring-loaded by a biasing member 82 in the direction D2. Specifically, the spring-loaded stopper 88 is spring-loaded by the biasing member 82 in the direction D2 and towards an engagement surface 90 defined by the lift element 70. In the embodiment as illustrated, the biasing member 82 is a coil spring that defines an opening (not visible in FIG. 2). The spring-loaded stopper 88 includes a body 96 is received by the opening of the spring coil. Although a coil spring is illustrated, it is to be appreciated that other types of biasing elements may be used as well.

The pivot arm 86 defines a first end 91 operationally connected to the cable 84 and a second end 92 operationally connected to the spring-loaded stopper 88. When a force is exerted upon either the first end 91 of the pivot arm 86 by the cable 84 or the second end 92 of the pivot arm 86 by the spring-loaded stopper 88, then the pivot arm 86 rotates about a pivot point 120 in either a clockwise or a counterclockwise direction. The rotation of the pivot arm 86 is described in greater detail below.

The cable 84 includes a free end 98 and a connecting end 102, where the connecting end 102 of the cable 84 is connected to the first end 91 of the pivot arm 86. The cable 84 may be urged in a direction D3 in response to a driver or other occupant of the vehicle 20 (FIG. 1) actuating the lever 100. As the lever 100 is actuated, a tensioning force is applied to the cable 84 in the direction D3, which generally opposes the first direction D1. In other words, the cable 84 is pulled in response to an operator actuating the lever 100. As the cable 84 is pulled in the direction D3, the cable 84 exerts a force oriented in a clockwise direction on the first end 91 of the pivot arm 86, which in turn causes the pivot arm 86 to rotate about the pivot point 120.

The free end 98 of the cable 84 is operatively connected to the lever 100 by a spring-loaded cable return assembly 110 and a locking tab 112. The spring-loaded cable return assembly 110 includes a biasing member 114 such as, for example, a coil spring and a body 116 that is shaped to be received by the coil spring. The biasing member 114 retains the spring-loaded cable return assembly 110 in a normally biased direction. The normally biased direction is oriented towards the cable 84 (i.e., the spring-loaded cable return assembly 110 does not pull at or create tension in the cable 84). This means that when the lift element 70 is not deployed into the extended position E and is in the retracted position, the spring-loaded cable return assembly 110 is positioned in the normally biased direction. As seen in FIG. 2, the spring-loaded cable return assembly 110 is retained in place when in the normally biased position by an end portion 118 of the body 114 that abuts against a surface 119 of a plate 108.

When the lever 100 is actuated by an operator, then the biasing member 114 of the spring-loaded cable return assembly 110 contracts or is squeezed inwardly, which in turn lifts the end portion 118 of the body 116 away from the surface 119 of the plate 108. The free end 98 of the cable 84 is connected to the end portion 118 of the body 108. Thus, when the biasing member 114 contracts then the cable 84 is placed in tension or is pulled.

In one embodiment, the lever 100 may be located within a passenger cabin of the vehicle 20 (FIG. 1), and a driver or a passenger of the vehicle 20 may actuate the lever 100 by turning or twisting the lever 100 about a corresponding turn axis T-T. An occupant of the vehicle 20 may exert an actuation force that is sufficient to turn the lever 100 about the corresponding turn axis T-T from a first, unactuated position and into a second deployed position. When the lever 100 is actuated the deployed position, the lift element 70 is urged into the extended position E by the actuation system 80, which in turn lifts the blade 54 of the wiper 32 away from the windshield 22.

As the cable 84 is pulled by the spring-loaded cable return assembly 110, the pivot arm 86 is urged to rotate about the pivot point 120 in the clockwise direction. As the pivot arm 86 rotates in the clockwise direction, the second end 92 of the pivot arm 86 is urged in the direction D2, which is towards the body 96 of the spring-loaded stopper 88. Specifically, as seen in FIGS. 2 and 3, the body 96 of the spring-loaded stopper 88 defines an end portion 130 that abuts against the second end 92 of the pivot arm 86 when the lever 100 is in the unactuated position, the spring-loaded assembly is in the normally biased position, and the lift element 70 is retracted. However, deploying the lever 100 causes the cable 84 to be pulled, which in turn causes the pivot arm 86 to rotate in the clockwise direction about the pivot point 120. As the pivot arm 86 rotates, the second end 92 of the pivot arm 86 urges the end portion 130 of the body 96 in the direction D2.

The body 96 of the spring-loaded stopper 88 is also received by an aperture 150 defined within a positioning plate 152. Specifically, as seen in FIG. 4, the body 96 of the spring-loaded stopper 88 may be substantially cylindrical in profile, and the aperture 150 is shaped to receive a portion of the body 96 of the spring-loaded stopper 88. The body 96 of the spring-loaded stopper 88 is configured to translate back and forth in the direction D2 and a direction D4 (which opposes the direction D2). The aperture 150 of the positioning plate 152 acts as a guide and allows for substantially linear translation of the body 96 of the spring-loaded stopper 88 in the directions D2 and D4.

The body 96 of the spring-loaded stopper 88 also defines a second, beveled or angled end 160. The angled end 160 of the body 96 abuts or otherwise engages with an angled end 162 defined by the body 79 of the lift element 70. In the embodiment as shown in FIGS. 2 and 4, both the angled end portions 160, 162 of the body 96 of the spring-loaded stopper 88 and the body 79 of the lift element 70 abut against each other. This is because FIGS. 2 and 4 illustrate the lift element 70 in the retracted position. However, as the body 96 of the spring-loaded stopper 88 is translated in the linear direction D2, the surface 166 of the angled end 160 of the body 96 slides against a surface 168 defined by the angled end 162 of the body 79 of the lift element 70. The sliding interaction between the two angled surfaces 166, 168 (which is shown in phantom line) causes the body 79 of the lift element 70 to move upwardly in the direction D1, and towards the arm 40 (FIG. 2).

As seen in FIG. 3, the surface 76 of the lift element 70 abuts against the surface 74 of the arm 40 when the lift element 70 is in the extended position E, and thereby lifts the arm 40 away from the outer surface 26 of the windshield 22 (FIG. 1). Referring generally to FIGS. 1, 2, and 3, the arm 40 is lifted so that the edge 60 of the blade 54 no longer contacts the outer surface 26 of the windshield 22. The lift element 70 continues to hold the arm 40 away from the windshield 22 until the operator disengages the lever 100. Specifically, the operator may disengage the lever 100 by turning or twisting the lever 100 about the turning axis T-T and back to its original, untwisted position.

Once the lever is disengaged, the lift element 70 may retract and the arm 40 is urged back into the parked position as seen in FIG. 2. The arm 40 is urged back into the parked position by a biasing force that is exerted upon the wiper 32 by a tensioning spring (not visible in FIGS. 1-4). The tensioning spring is configured to apply pressure against the arm 40 of the wiper 32, which in turn allows the blade 54 of the wiper 32 to be firmly positioned against the outer surface 26 of the windshield 22 (FIG. 1).

Figure 5:
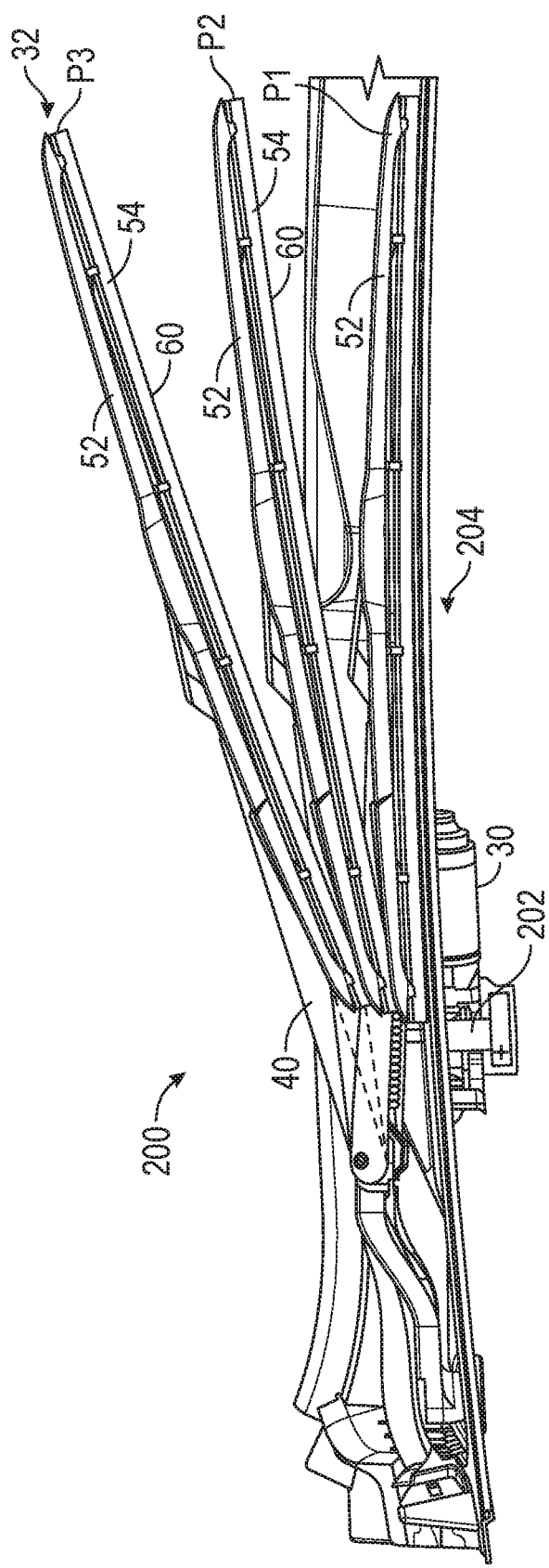
FIG. 5 illustrates an alternative embodiment of a system for lifting the wiper away from the windshield using an actuator and a bracket according to an exemplary embodiment.
Figure 6:
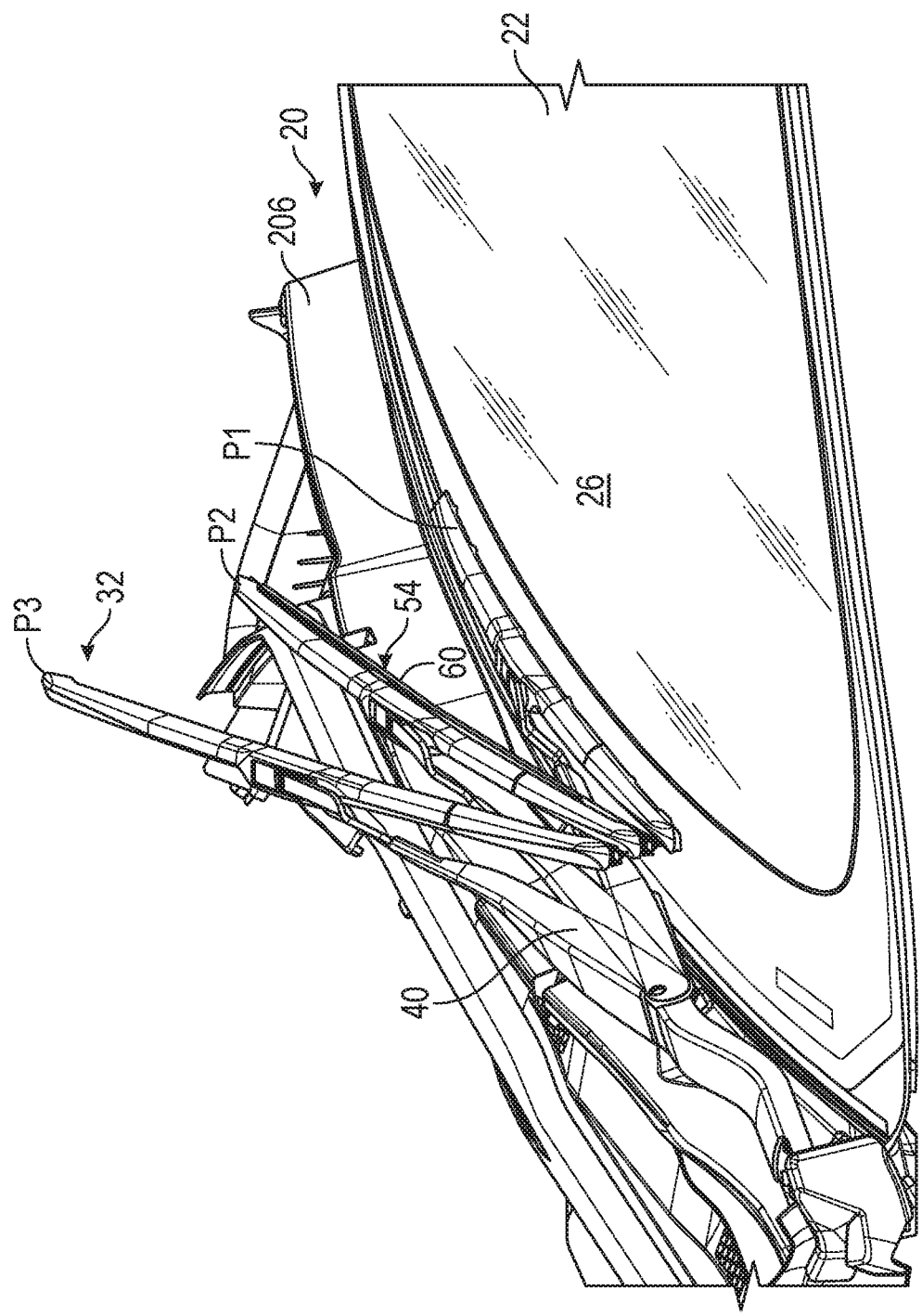
FIG. 6 is a perspective view of the system shown in FIG. 5 according to an exemplary embodiment.

FIGS. 5 and 6 are an alternative embodiment of a system 200 that is used to urge the arm 40 of the wiper 32 out of the parked position and away from the outer surface 26 of the windshield 22. However, unlike the embodiment as described above that is actuated based on a series of mechanical components, the embodiment as shown in FIGS. 5 and 6 employ an actuator 202. More specifically, the actuator 202 is a linear actuator configured to produce relatively straight motion (in contrast to the circular motion that is generated by an electric motor). In one embodiment, the linear actuator 202 is a solenoid.

In the embodiment as shown in FIGS. 5 and 6, the actuator 202 is located within a cowl area 204 of the vehicle 20 (the vehicle 20 is shown in FIG. 1). The cowl area 204 may support a rear portion 206 of the hood 17 of the vehicle 20 and the windshield 22 (the hood 17 and the windshield 22 are shown in FIG. 1). Since the cowl area 204 may collect precipitation (e.g., rainwater, melted snow, etc.), the actuator 202 may be exposed to moisture. Accordingly, in one embodiment the actuator 202 may be a substantially fluid-tight component. In other words, the actuator 202 may be sealed to substantially prevent the ingression of fluids present within the cowl area 204.

FIGS. 5 and 6 both illustrate the wiper 32 positioned in three unique positions. Specifically, the wiper 32 is shown in the parked position P1. An intermediate position P2 represents the wiper 32 positioned away from the outer surface 26 of the windshield 22. A deployed position P3 illustrates the wiper 32 extended completely away from the windshield 22, where the intermediate position P2 is located between the parked position P1 and the deployed position P3. As explained below, the wiper 32 is actuated from the parked position P1 and into the extended position P3 based on linear movement created by the actuator 202.

In one non-limiting embodiment, the wiper 32 is lifted at about 10° relative to the windshield 22 when in the intermediate position P2 and at about 20° relative to the windshield 22 when in the parked position P3. However, it is to be appreciated that these values are merely exemplary in nature. A variety of different measurements and angles may be used and are based on the specific geometry and requirements of a vehicle.

Figure 7:
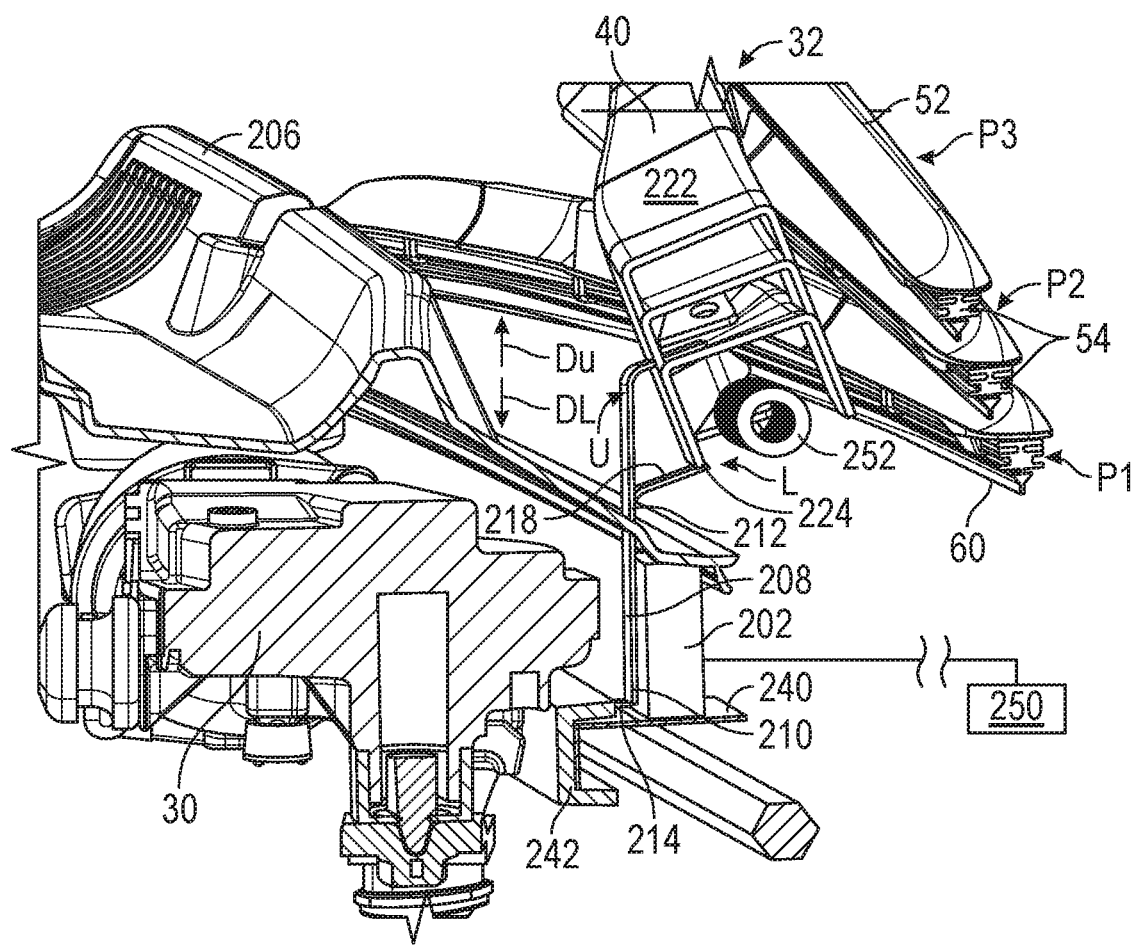
FIG. 7 is a partially cross-sectioned view of the system shown in FIG. 5 and a wiper motor.

Continuing to refer to both FIGS. 5 and 6, the actuator 202 is configured to exert a force against the arm 40 that is sufficient to urge the arm 40 out of the parked position P1 and away from the outer surface 26 of the windshield 22. This also lifts the blade 54 of the wiper 32 from the outer surface 26 of the windshield 22. Turning now to FIG. 7, a cross-sectioned side view of the wiper 32 is shown in the three positions P1, P2, and P3. FIG. 7 also illustrates the wiper motor 30, the actuator 202, a cowl top covering 206, and a bracket 208 that operatively connects the actuator 202 to the arm 40 of the wiper 32.

In the exemplary embodiment as shown, the bracket 208 includes a proximate end portion 210 and a distal end portion 212. The proximate end portion 210 of the bracket 208 is connected to the actuator 202 and the distal end portion 212 of the bracket 208 is connected to the arm 40 of the wiper 32. The actuator 202 also includes an output 214 that is connected to the distal end portion 212 of the bracket 208. The output 214 of the actuator 202 travels back and forth in an upper direction $D_U$ and a lower direction $D_L$ to move the arm 40 of the wiper between the parked position P1 and the deployed position P3. The bracket 208 moves in concert with the output 214 of the actuator 202 between the upper and lower directions $D_U$ and $D_L$. The bracket 208 may translate in the upper and lower directions $D_U$ and $D_L$ between a lowermost position L and an uppermost position U. The parked position P1 of the wiper 32 corresponds to the lowermost position L of the bracket 208. Similarly, the deployed position P3 of the wiper 32 corresponds with the uppermost position U of the bracket 208.

The bracket 208 is constructed of a material having a rigidity or strength that is sufficient to support the weight of the wiper 32. More specifically, the bracket 208 is constructed of a material sufficient to support the wiper 32 as the wiper 32 is lifted out of the parked position (i.e., the first position P1) and into the third position P3. For example, in one embodiment the bracket 208 may be constructed of metal. In the embodiment as shown in FIG. 7, the distal end portion 212 of the bracket 208 includes a bent profile. That is, the distal end portion 212 of the bracket 208 defines a shelf 218. The shelf 218 is shaped to support a portion of a body 222 of the arm 40. Specifically, in the embodiment as shown the shelf 218 of the arm 40 is shaped to support a lower surface 224 that is defined by the body 222 of the arm 40.

Figure 8:
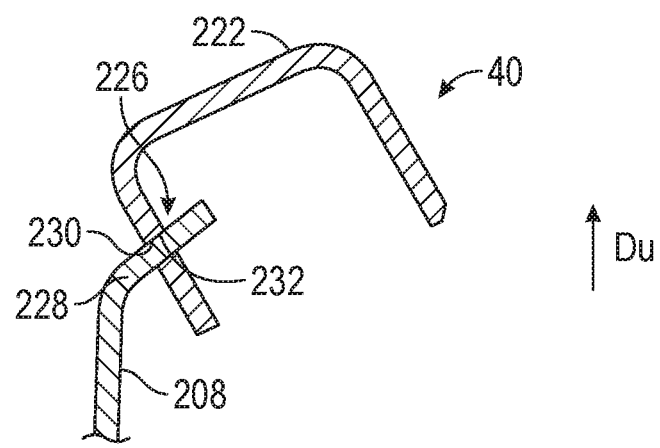
FIG. 8 is an alternative illustration of the bracket shown in FIG. 7 according to an exemplary embodiment.

Although FIG. 7 illustrates the bracket 208 supporting the lower surface 224 of the body 222 of the arm 40, it is to be appreciated that this embodiment is merely exemplary in nature. Indeed, the bracket 208 may engage and provide support for the arm 40 in any number of configurations. For example, FIG. 8 is a cross-sectioned view of an alternative embodiment of the arm 40. In the embodiment as shown in FIG. 8, the body 222 of the arm 40 defines an opening or aperture 226. The aperture 226 is shaped to receive a portion 228 of the bracket 208. Thus, the bracket 208 urges the arm 40 in the upward direction $D_U$ by abutting against an inner surface 230 defined by the aperture 226. Specifically, the bracket 208 abuts against an upper portion 232 of the inner surface 230 of the aperture 226 of the arm 40.

Turning back to FIG. 7, the actuator 202 is supported or held in place by a support bracket 240. The support bracket 240 may mount to a portion of sheet metal 242 of the vehicle 20. The actuator 202 may be actuated in the upper direction $D_U$ and the lower direction $D_L$ by a control module 250 of the vehicle 20. Specifically, the control module 250 is in electronic communication with the actuator 202. The control module 250 sends electronic signals to the actuator 202 indicating the linear position of the output 214. The actuator 202 translates the output 214 either in the upward direction $D_U$ or lower direction $D_L$ based on the electronic signals from the control module 250.

The control module 250 is a non-generalized, electronic control device having a preprogrammed digital computer or processor, memory or non-transitory computer readable medium used to store data such as control logic, instructions, image data, lookup tables, etc., and a plurality of input/output peripherals or ports. The processor of the control module 250 is configured to execute the control logic or instructions. In one embodiment, the control module 250 is an electronic control unit (ECU).

Referring generally to FIGS. 5, 6, and 7, a driver or passenger of the vehicle 20 may activate the system 200 in a variety of ways. For example, the driver or passenger may activate the system 200 by a button located within the passenger compartment of the vehicle (not shown), based on a voice command, or by selecting an option that is provided upon a display (not shown). In one specific example, the driver may decide to activate the system 200 by selecting an option that is shown upon a center display located within the passenger cabin (not shown). Once the system 200 is activated, the blade 54 of the wiper 32 is lifted away from the outer surface 26 of the windshield 22. The driver may then exit the vehicle 20.

In one example, the driver may exit the vehicle and activate the system 200 the night before a snowstorm or heavy ice storm. The driver may then re-enter the vehicle 20 the following day, after the snowstorm. Once the driver re-enters the vehicle 20, he or she may deactivate the system 200 in the same manner that the system 200 was activated (e.g., selecting an option upon a display). Once the system is deactivated, the bracket 208 is moved into the lowered direction $D_L$ by the output 214 of the actuator 202 until the wiper 32 is placed back into the parked position P1. The arm 40 is urged back into the parked position by a biasing force that is exerted upon the wiper 32 by a tensioning spring 252 (seen in FIG. 7). The tensioning spring 252 is operatively coupled to the arm 40. In the embodiment as shown in FIG. 7, the tensioning spring 252 is a coil spring.

Referring generally to the figures, the disclosure provides various approaches for lifting the wiper blade away from the outer surface of the windshield. Lifting the wiper blade may prevent the blade from freezing to the windshield. Since individuals tend to rip or tear frozen wiper blades from the windshield when removing snow or ice from the vehicle, lifting the wiper blade using the approaches described above may prolong or enhance the overall life of the blade. Furthermore, since the disclosed system may be activated or deployed using a button, voice commands, a display system, or the like while the driver and/or passenger is still seated within the vehicle, individuals may no longer need to lean against the wet, dirty exterior of the vehicle to lift their wiper blades.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A wiper system for clearing an outer surface of a window, the wiper system comprising:
    an arm having a parked position and defining a proximate end portion and a distal end portion, the arm being pivotable about the proximate end portion of the arm out of the parked position;
    a frame pivotally connected to the distal end portion of the arm, wherein the frame defines a lengthwise distance;
    a blade extending along at least a lengthwise portion of the frame, wherein the blade defines an edge that is configured to contact the outer surface of the window when the arm is in the parked position; and an actuator operatively connected to the arm, wherein the actuator is configured to exert a force against the arm that is sufficient to urge the arm out of the parked position and away from the outer surface of the window to lift the blade from the outer surface of the window, the actuator comprising a lift element having a first surface and an engagement surface, the first surface being positioned to face the arm and the engagement surface being positioned opposite the first surface, the actuator comprising a pivot arm having a first end and a second end, the first end being operatively connected to a cable and the second end being operatively connected to a spring-loaded stopper, the spring-loaded stopper being biased against the pivot arm such that when a force is exerted on the first end by the cable, the pivot arm rotates about a pivot point biasing the stopper into engagement with the engagement surface to move the lift element and urge the arm out of the parked position and lift the blade from the outer surface of the window.

2. The wiper system of claim 1, further comprising a linkage, wherein the linkage connects the proximate end portion of the arm to a rotational shaft.

3. The wiper system of claim 2, wherein the arm oscillates about the rotational shaft during operation of the wiper system.

4. The wiper system of claim 1, wherein the window is one of a windshield of a vehicle, a back glass of the vehicle, or is part of a headlight of the vehicle.

5. The wiper system of claim 1, comprising a motor operatively connected to the arm by a plurality of linkages.

6. The wiper system of claim 1, further comprising a tensioning spring operatively coupled to the arm.

7. A system for a vehicle, comprising:
a window defining an outer surface;
a wiper system including at least one wiper and a rotating shaft, wherein the wiper oscillates about the rotational shaft to clear the outer surface of the window, wherein the wiper includes:
an arm having a parked position and defining a proximate end portion and a distal end portion, the arm being pivotable about the proximate end portion of the arm out of the parked position;
a frame pivotally connected to the distal end portion of the arm, wherein the frame defines a lengthwise distance;
a blade extending along at least a lengthwise portion of the frame, wherein the blade defines an edge that is configured to contact the outer surface of the window when the arm is in the parked position; and
an actuator operatively connected to the arm, wherein the actuator is configured to exert a force against the arm that is sufficient to urge the arm out of the parked position and away from the outer surface of the window to lift the blade from the outer surface of the window, the actuator comprising a lift element having a first surface and an engagement surface, the first surface being positioned to face the arm and the engagement surface being positioned opposite the first surface, the actuator comprising a pivot arm having a first end and a second end, the first end being operatively connected to a cable and the second end being operatively connected to a spring-loaded stopper, the spring-loaded stopper being biased against the pivot arm such that when a force is exerted on the first end by the cable, the pivot arm rotates about a pivot point biasing the stopper into engagement with the engagement surface to move the lift element and urge the arm out of the parked position and lift the blade from the outer surface of the window.

8. The wiper system of claim 7, further comprising a linkage, wherein the linkage connects the proximate end portion of the arm to the rotational shaft.

\* \* \* \* \*